July 27, 1943.  F. J. BLACK, SR  2,325,362
APPARATUS FOR GAUGING DIMENSIONS OF CIRCULAR WORKPIECES
Filed May 14, 1942  2 Sheets-Sheet 1
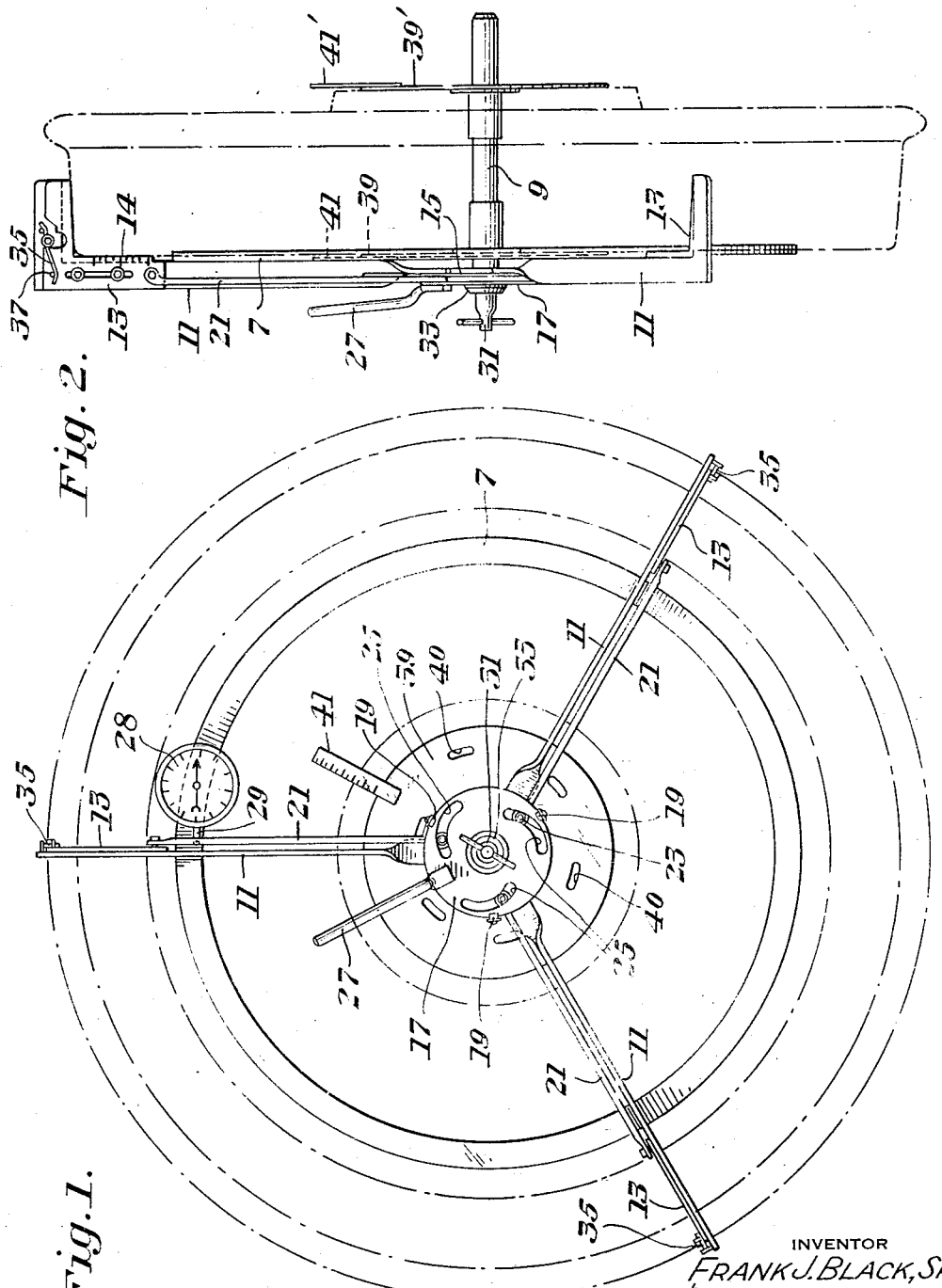
INVENTOR
FRANK J. BLACK, SR.,
by John E. Jackson
his Attorney.

July 27, 1943.   F. J. BLACK, SR   2,325,362
APPARATUS FOR GAUGING DIMENSIONS OF CIRCULAR WORKPIECES
Filed May 14, 1942   2 Sheets-Sheet 2
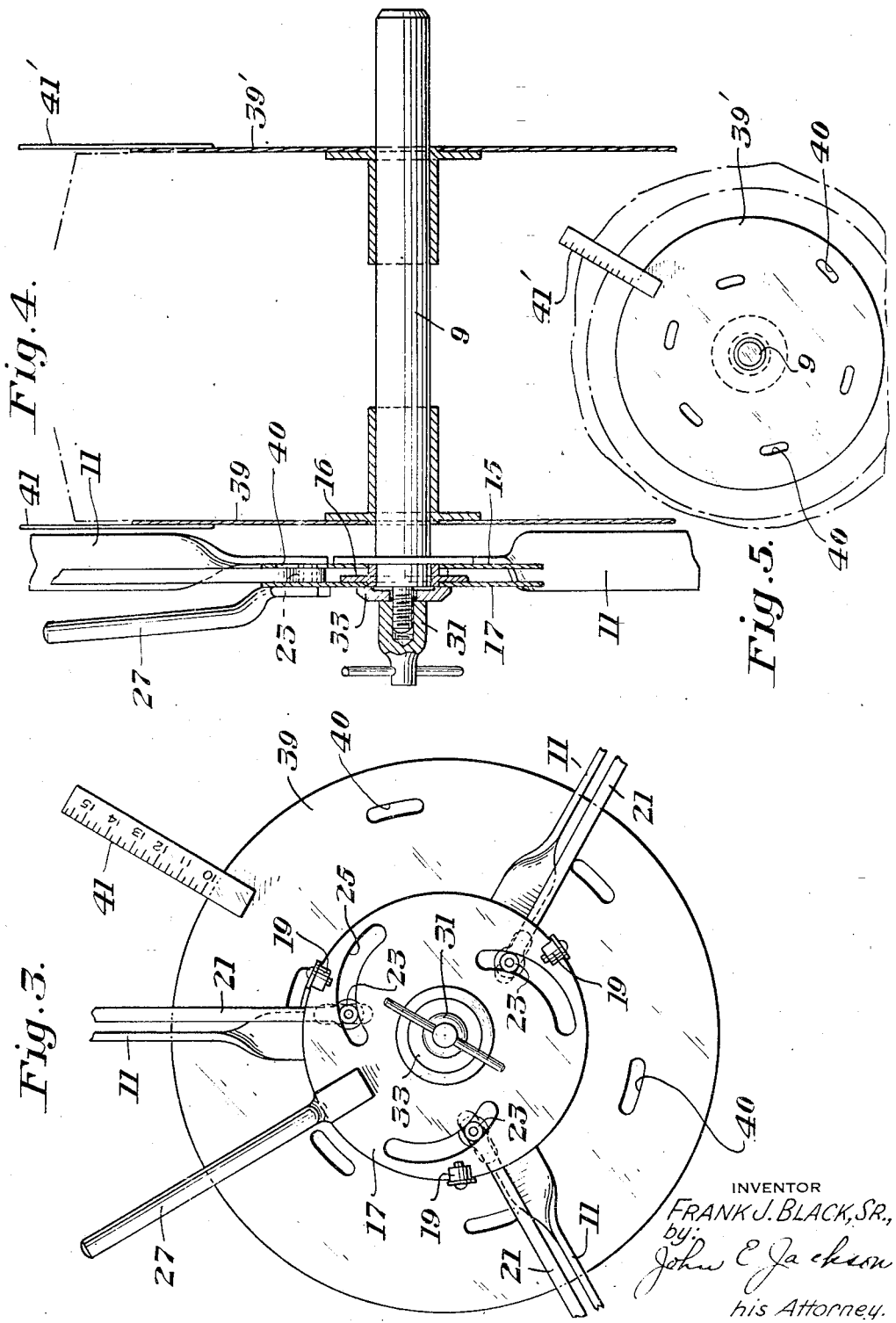

Patented July 27, 1943

2,325,362

UNITED STATES PATENT OFFICE 2,325,362

APPARATUS FOR GAUGING DIMENSIONS OF CIRCULAR WORKPIECES

Frank J. Black, Sr., Crafton, Pa.

Application May 14, 1942, Serial No. 442,974

7 Claims. (Cl. 33—203)

In order to determine whether rigid specifications are fulfilled by the industrial output of many types of manufactured articles, it becomes necessary to apply quick tests thereto in order to ascertain the fulfillment of the stated specifications and to reject such of the articles which fail to conform thereto.

In certain lines of production, it is necessary for the required specifications to be very rigid and to be fulfilled very rigidly; and the present invention relates to gauging various dimensions of circular workpieces, the invention relating more particularly to a device by means of which circular workpieces, such as railroad car wheels, may be measured in various critical dimensions before being placed in service.

While the invention is adapted particularly to the measurement of such various critical dimensions of car wheels, it may be adapted with slight modifications to similar measurements of other circular objects, such as disks, sheaves, pulleys, gear blanks and the like.

With reference to the invention as applied to car wheels, it may be pointed out that, in general, railroad car wheels comprise a single piece, either of cast iron or forged roll steel. The wheel usually is finished as to tread size and other important dimensions by a machine turning operation. From the standpoint of service, the tread diameter is the most critical dimension, this being true because it is necessary to machine the circumference of each of a pair of wheels which are to be mounted on a single axle in order to insure most effective operation in normal railway service.

Prior to the present invention the practice was to measure the tread circumference by the use of an endless steel tape graduated in eighths of an inch beginning with seven feet as a zero mark for wheels twenty-eight inches and over in diameter and with four feet as a zero mark for wheels of smaller diameter. In the railway car industry, this matching of the circumference of a pair of wheels intended for mounting on a single axle is termed "mating." According to the standard specifications of the Association of American Railroads, the limit of the allowable variation in mating is one-half tape size, which means a variation of one-sixteenth inch in circumference, which is equal to approximately 0.01 inch in radius. Heretofore in practice the taping line was specified at a predetermined location on the face of the car wheel intermediate the front face of the rim and flange of the wheel, it being remembered that standard car wheels are slightly coned and thus are substantially frusto-conical in form.

Heretofore as a means for insuring that the wheel would be taped at the proper taping line, the tape was provided at intervals with lugs adapted to engage the wheel flange so as thus to position the tape for measurement at the predetermined proper taping line location.

Heretofore in the conventional practice of taping the wheel there are several variables which have a tendency for causing the making of inaccurate measurements. For example, the tape lugs may not be given the proper bearing against the wheel flange; the amount of tension manually exerted in tightening the tape may be applied non-uniformly from wheel to wheel, or individual operators may make different interpretations of the indicated tape reading. Thus, if inaccurate taping results in the wheel being machined to a diameter below the 0.01 radius mating tolerances, the wheel must be discarded for a specific mating and the machining continued to a radius which will be satisfactory for mating with a smaller wheel. If the wheel is finished oversize by more than 0.01 inch radius, it may be rejected upon inspection. A particular difficulty arises because of the necessity of determining accurately the exact circumferential measurement at a given peripheral taping line on a tapered car wheel. Thus, there are problems solved by the present invention which are not inherent in the calipering of ordinary cylindrical workpieces.

In addition to the foregoing difficulties and possible sources of error in the use of a steel tape for measuring, errors may result in the use of calipers and scale.

The present invention provides a measuring device, the construction of which enables the avoidance of such inaccuracies and facilitates the production of wheels and similar shapes having more nearly exact dimensions.

The invention will be understood more clearly from a consideration of the accompanying drawings, in which:

Fig. 1 is a front elevational view of the gauging device of the present invention, showing the device mounted upon a machine-finished car wheel;

Fig. 2 is a side elevational view of the device, shown as being mounted upon a machine-finished car wheel as shown in Fig. 1;

Fig. 3 is a plan view of the device of the invention, the view showing the device unmounted;

Fig. 4 is a fragmentary sectional elevation of the device; and,

Fig. 5 is a front elevation of one of the disk members forming a part of the construction of the present invention.

Referring more particularly to the drawings, the invention includes an annular frame 7 which is connected fixedly to a shaft 9 by means of the arms 11 which are secured to a disk 15. The frame 7 has attached suitably to it, as by welding, a suitable number of the radial arms 11, which may be three or more in number, three being shown, the arms 11 being spaced at equal distances apart, and extending outwardly beyond the radius of the largest wheels to be gauged, each of these arms having mounted slidably at its outer end by a suitable slot and pin arrangement a tread gauging element 13 provided with a rim thickness inch scale 14, as shown in Fig. 2.

A centering disk 15 is mounted fixedly on the shaft 9, and a rotating cam plate 17 is mounted rotatably on the shaft 9 in front of the centering disk 15, being spaced therefrom by means of a flanged sleeve 16. The motion of the plate 17 is guided by spaced rollers 19 which are mounted upon the disc 15, as shown in Figs. 1 and 3. A radial link 21 extends from the rotating cam plate 17 along each of the guide arms 11, to the gauging elements 13. At its inner end each link is provided with a cam roller 23, each of the cam rollers being positioned in a cam slot 25 in the cam plate 17. The gauging elements 13 are made to move in and out, radially, by manually rotating the cam plate 17 by means of a hand lever 27.

Mounted on the frame 7 adjacent to one of the links 21 is a circular dial gauge 28, which is actuated by a lever 29, which is pivotally pin-connected to the adjacent link 21. The gauge 28 is calibrated in tape sizes and gives the circumference of the wheels expressed in this term.

The front end of the shaft 9 is provided with a threaded portion, and a wing nut 31 is mounted on this portion. A clamping washer 33 is disposed beneath the wing nut 31 and the rotating cam plate 17. When the lever 27 is rotated so as to bring the tread gauging elements 13 into contact with the tread of a wheel, the wing nut 31 is tightened, thereby clamping the gauge to the wheel and maintaining the rotating cam plate 17 immovable. When the wing nut 31 is loosened, the gauging elements 13 are moved outwardly by action of springs 35, there being one of these springs mounted on the outer end of each of the guide arms 11, and in contact with the gauging elements 13 through means of suitable pins, such as pin 37.

From the foregoing it will be seen how the mechanism of the present invention is employed for gauging the wheel tread in tape size and the rim thickness. The elements of the construction for gauging the hub dimensions of the wheel will be described and the operation thereof will be explained hereinafter.

For this gauging a pair of rotating disks 39, 39' are adapted to fit closely the shaft 9. These disks may be made of metal and provided with slotted holes 40, as shown in Figs. 3 and 5, for example, or the disks may be made of plastic material which is transparent, in which case the slotted holes may be replaced by scribed circles. In either case the resulting markings extend throughout the range from minimum bore diameter to maximum hub outer diameter. One of the disks 39 is placed on the shaft 9 immediately behind the arms 11, as shown in Figs. 2 and 4.

Now, when the gauge device is clamped upon a wheel for gauging, then the position of the shaft 9 is central with respect to the wheel tread. That is to say, the true axis of the wheel is determined. By observing the bore of the wheel through the proper slot 40 or scribe mark on this disk 39, the bore diameter is obtained. The disk 39 then is rotated slowly and the hub outer diameter is observed by means of a scale 41 which is mounted upon disk 39 and extends radially outwardly therefrom. The concentricity of the hub outer diameter also is checked at this time.

The second disk 39' then is placed upon the end of the shaft 7 which extends through the rear of the wheel bore, and the same points of consideration are noted for the back of the wheel and in like manner as described above, with the aid of scale 41', which is similar to scale 41.

Upon completion of such observations, the wing nut 31 then is loosened and expansion of the gauging elements 13 initiated by rotating the lever 27 counter-clockwise. The gauge device then is removed from the wheel and the gauging cycle repeated on other wheels.

This cycle of operations may be summarized as follows:

1. Remove the outer rotating disk 39' for the rear end of the wheel hub and insert the end of the central shaft 9 through the bore in the hub, moving the gauge forwardly so that the outer ends of arms 11 and gauging elements pass over the tread of the wheel, and the gauge comes to a stop against the rim of the wheel tread.

2. With the hand grasp lever 27 and turn it in a clockwise direction until the tread diameter gauges 13 are firmly against the tread of the wheel, then lock the gauge in this position by tightening the wing nut 31.

3. Observe reading of the dial of the gauge 28 which gives the tape size of the wheel being inspected.

4. Observe the reading of the scale 14 at the rim of the wheel, and get the rim thickness in inches.

5. Observe the bore of the hub at the front end by looking through the proper slot 40 in disk 39. Rotate the disk 39 and observe if the bore of the hub is central by its position relative to the slot 40. Also observe scale 41 while the disk 39 is rotating and ascertain if the hub is central with the rim; and the hub diameter.

6. Place remaining disk 39' on central shaft 9 at the rear of the hub and repeat the inspection set forth in (5) above on the rear end of the hub.

7. Remove disk 39' at rear end of hub. Loosen wing nut 31 and open gauge by rotating lever 27 counter-clockwise until it stops. Remove the gauge from inspected wheel, thus completing the cycle of operation.

I claim:

1. Mechanism for indicating specified dimensions of parts of a circular workpiece, which comprises a shaft adapted to be inserted in a central bore of the workpiece, an annular frame mounted on the shaft, a plurality of radial arms mounted on the frame and extending outwardly beyond the radius of the largest workpiece to be measured, measuring means slidably mounted on the arms at outer ends thereof, a centering disk fixedly mounted on the shaft, a rotating cam plate on the shaft in front of the centering disk, means spacing the cam plate from the centering disk, radial links extending from the cam plate along each of the radial arms to the measuring means, and means for operating the cam plate to effect radial movement of the measuring means.

2. Mechanism for indicating specified dimensions of parts of a railroad car wheel, which comprises a shaft adapted to be inserted in a central bore of the wheel, an annular frame mounted on the shaft, a plurality of radial arms mounted on the frame and extending outwardly beyond the radius of the largest wheel to be measured, measuring means slidably mounted on the arms at outer ends thereof, a centering disk fixedly mounted on the shaft, a rotating cam plate on the shaft in front of the centering disk, means spacing the cam plate from the centering disk, radial links extending from the cam plate along each of the radial arms to the measuring means, indicating means mounted on the frame adjacent to one of the links adapted to indicate circumferential measurement of the wheel, actuating means for the cam plate, and means for operating the indicating means responsively to actuation of the links responsively to operation of the cam plate.

3. Mechanism for indicating dimensions of specified portions of a railroad car wheel, which comprises a shaft adapted to be inserted in a central bore of the wheel, an annular frame mounted on the shaft, a plurality of radial arms mounted on the frame and extending outwardly beyond the radius of the largest wheel to be measured, measuring means slidably mounted on the arms at outer ends thereof, a centering disk fixedly mounted on the shaft, a rotating cam plate on the shaft in front of the centering disk, means spacing the cam plate from the centering disk, radial links exending from the cam plate along each of the radial arms to the measuring means, indicating means mounted on the frame adjacent to one of the links adapted to indicate circumferential measurement of the wheel, actuating means for the cam plate, means for operating the indicating means responsively to actuation of the links responsively to operation of the cam plate, and releasable locking means for the cam plate for rendering the cam plate immovable and for clamping the entire indicating mechanism to the wheel.

4. Mechanism for indicating dimensions of specified portions of a railroad car wheel, which comprises, in combination, a shaft adapted to be inserted in a central bore of the wheel, an annular frame mounted on the shaft, a plurality of radial arms mounted on the frame and extending outwardly beyond the radius of the largest wheel to be measured, measuring means slidably mounted on the arms at outer ends thereof, a centering disk fixedly mounted on the shaft in front of the centering disk, means spacing the cam plate from the centering disk, radial links extending from the cam plate along each of the radial arms to the measuring means, indicating means mounted on the frame adjacent to one of the links adapted to indicate circumferential measurement of the wheel, actuating means on the cam plate, means for operating the indicating means responsively to actuation of the links responsively to operation of the cam plate, and means on the shaft for gauging bore diameter, concentricity of the bore and concentricity of outer diameter of the wheel hub.

5. Mechanism for indicating dimensions of specified portions of a railroad car wheel, which comprises, in combination, a shaft adapted to be inserted in a central bore of the wheel, mechanism on the shaft for measuring wheel tread in tape size and rim thickness, a pair of rotating disks mounted on the shaft, one of the said disks being at the front of the wheel and the other of the disks being at the rear of the wheel, observation means on the disks extending throughout the range from minimum bore diameter to maximum hub outer diameter, and means enabling the disks to be rotated, and a scale on each of the disks, whereby upon rotation of the disks there may be observed concentricity of the bore, outer hub diameter and concentricity of outer hub diameter, all on both sides of the wheel.

6. Mechanism for indicating dimensions of specified portions of a railroad car wheel, which comprises, in combination, a shaft adapted to be inserted in a central bore of the wheel, instrumentalities on the shaft for measuring wheel tread in tape size and rim thickness, rotary disk means mounted on the shaft, observation means on the disk means extending throughout the range from minimum bore diameter to maximum hub outer diameter, means enabling the disk means to be rotated, and a scale on the disk means, whereby upon rotation of the disk means there may be observed the concentricity of the bore, outer hub diameter and the concentricity of the outer hub diameter.

7. Mechanism for indicating dimensions of specified portions of a railroad car wheel, which comprises, in combination, a shaft adapted to be inserted in a central bore of the wheel, instrumentalities on the shaft for measuring wheel tread in circumference and rim thickness, rotary disk means mounted on the shaft, observation means on the disk means extending throughout the range from minimum bore diameter to maximum hub outer diameter, means enabling the disk means to be rotated, a scale on the disk means, whereby upon rotation of the disk means there may be observed the concentricity of the bore, outer hub diameter and the concentricity of the outer hub diameter, and releasable clamping means for clamping the entire mechanism in operative position on the wheel.

FRANK J. BLACK, Sr.